Patented Dec. 23, 1952

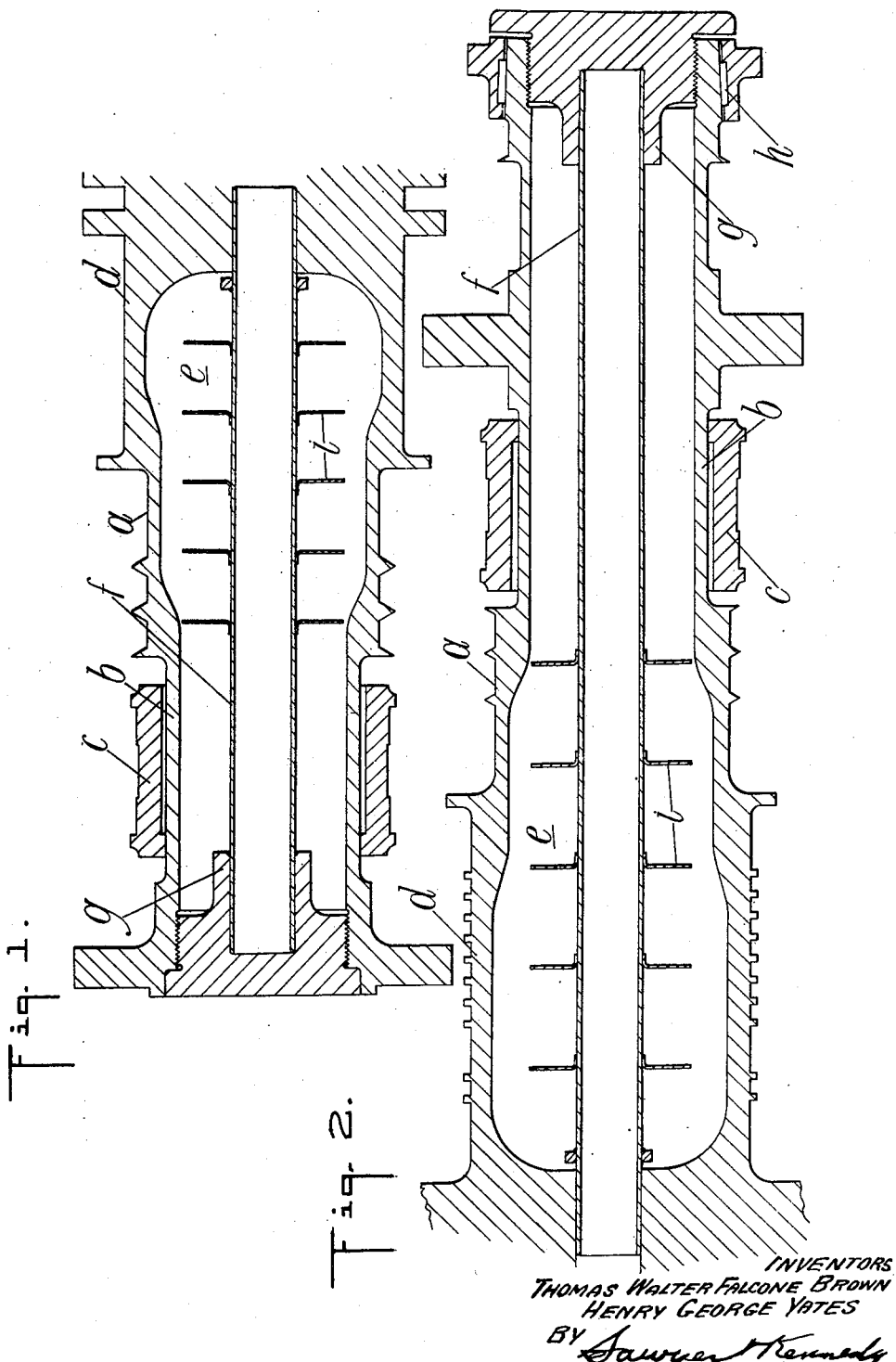

2,622,417

UNITED STATES PATENT OFFICE 2,622,417

SHAFT FOR GAS TURBINES AND THE LIKE

Thomas Walter Falconer Brown, Gosforth, and Henry George Yates, Northumberland, England, assignors to The Parsons and Marine Engineering Turbine Research and Development Association, Wallsend, England Application March 7, 1947, Serial No. 733,063
In Great Britain May 7, 1946

4 Claims. (Cl. 64—1)

This invention relates to gas turbines and like apparatus involving rotors operating at extremely high temperatures and has for its object to provide means for shielding the bearings of such rotors from the intense heat liable to prevail in such apparatus.

The invention consists in a gas turbine or like rotor the shaft of which is furnished with a cavity adjacent to a bearing thereof, in which cavity is disposed one or more plates spaced apart axially from the end walls of the cavity.

The invention also consists in a gas turbine or like rotor as set forth in the preceding paragraph wherein the diameter of the plate or plates is the maximum that can conveniently be inserted through a hollow in the shaft communicating with said cavity.

The invention also consists in a gas turbine or like rotor as set forth in either of the two preceding paragraphs, wherein said plate or plates are mounted on a rod projecting from the inner wall of the cavity and supported by a spider or disc adjacent to the other end of the said cavity.

The invention also consists in a gas turbine or like rotor as set forth in either of the two preceding paragraphs, wherein the thickness of metal connecting the bearing portion of the shaft with the main body of the rotor is reduced to reduce heat conduction from the rotor to the bearing.

The invention also consists in a gas turbine rotor or the like having heat shielding means substantially as hereinafter described with reference to the accompanying drawing.

In the drawing, Fig. 1 is a diagrammatic vertical longitudinal section through the shaft at one end of a gas turbine rotor embodying the present invention, and Fig. 2 is a similar section through the shaft at the other end of the rotor.

In carrying the invention into effect according to one convenient form illustrated by way of example in the accompanying drawing, as applied to a gas turbine rotor, the diameter of the rotor shaft $a$ near both ends is reduced at $b$ where it is carried in the actual bearing $c$ as compared with the gland portion $d$ of the rotor shaft and provide an internal cavity $e$ within the gland and bearing portions at each end of the rotor shaft, the walls of which cavities lie concentric to and substantially correspond with the contour of those portions. Each cavity extends inwards beyond the bearing for a distance approximately equal to the axial length of the gland and in each cavity is disposed one end of an axial rod $f$ projecting from the inner wall of the cavity and supported by a spider or disc $g$ at the outer end of the cavity. Carried on each rod end are five metal discs $i$ spaced apart axially from one another equidistantly and of a diameter about two-thirds of the diameter of the cavity.

The discs are spaced so as to cover approximately the full length of the cavities so that radiation from its periphery and not only from its inner end, is restricted. These metal discs are polished on their faces to augment reflection of heat radiated from the walls of the cavities. The diameter of the radiation shields is the maximum which can conveniently be inserted through the bores of the rotor shaft ends.

Preferably the discs are mounted on the tube in such manner that they may readily be removed and if necessary replated to maintain brightness so that they continue to act as reflecting bodies.

With this arrangement, the bearings $c$ are shielded to a substantial extent from the heat radiated from the rotor. Furthermore, owing to the reduced thickness of the metal of the gland portions $d$ of the shaft as compared with that of the shaft adjacent to the main body of the rotor a high moment of inertia at the gland portions is secured and heat conveyed to the bearing by conduction through the shaft is also reduced.

Furthermore, the outer diameter of the shaft ends requires only a small increase in diameter at the gland portions as compared with that at the bearings in order to secure adequate strength.

What is claimed is:

1. A turbine rotor shaft having a cavity therein adjacent to a bearing thereof, at least one flat polished plate laterally disposed within said cavity between the end walls thereof and spaced apart from the walls thereof, and means within the cavity supporting the plate.

2. A turbine rotor shaft as claimed in claim 1 wherein the cavity extends to the end of the shaft and the diameter of the plate or plates is such that they can only just be inserted into the cavity from the end of the shaft.

3. A turbine rotor shaft as claimed in claim 1 wherein the means supporting said plate or plates comprises a supporting rod projecting from the inner wall of the cavity, said rod being supported also by a spider at the other end of said cavity.

4. A turbine rotor shaft as claimed in claim 1 comprising a central body portion, a tubular gland portion at each end adjacent to said body portion and a co-axial tubular bearing portion at each end remote from said body portion.

THOMAS WALTER FALCONER BROWN.
HENRY GEORGE YATES.

REFERENCES CITED

The following references are of record in the file of this patent:

UNITED STATES PATENTS

| Number | Name | Date |
|---|---|---|
| 112,513 | Thompson | Mar. 7, 1871 |
| 1,986,219 | Richards | Jan. 1, 1935 |
| 2,395,128 | Ledwith | Feb. 19, 1946 |
| 2,439,447 | Buck et al. | Apr. 13, 1948 |